United States Patent
Madhusudana et al.

(10) Patent No.: US 8,904,108 B2
(45) Date of Patent: Dec. 2, 2014

(54) METHODS AND STRUCTURE ESTABLISHING NESTED REDUNDANT ARRAY OF INDEPENDENT DISKS VOLUMES WITH AN EXPANDER

(71) Applicant: LSI Corporation, Milpitas, CA (US)

(72) Inventors: Naresh Madhusudana, Bangalore (IN); Kiran Math, Bangalore (IN)

(73) Assignee: LSI Corporation, Milpitas, CA (US)

( * ) Notice: Subject to any disclaimer, the term of this patent is extended or adjusted under 35 U.S.C. 154(b) by 236 days.

(21) Appl. No.: 13/665,038

(22) Filed: Oct. 31, 2012

(65) Prior Publication Data

US 2014/0122798 A1    May 1, 2014

(51) Int. Cl.
*G06F 12/00*    (2006.01)
*G06F 12/16*    (2006.01)
*G06F 13/00*    (2006.01)

(52) U.S. Cl.
USPC ........... 711/114; 711/154; 711/167; 711/170; 710/11; 710/105

(58) Field of Classification Search
CPC .................................................. G06F 3/0689
USPC .......................................... 711/114; 710/105
See application file for complete search history.

(56) References Cited

U.S. PATENT DOCUMENTS

| | | | |
|---|---|---|---|
| 4,156,798 A | 5/1979 | Doelz | |
| 5,335,227 A | 8/1994 | Smith | |
| 5,579,480 A | 11/1996 | Cidon | |
| 6,096,116 A | 8/2000 | Huff et al. | |
| 6,199,137 B1 | 3/2001 | Aguilar | |
| 6,301,642 B1 | 10/2001 | Jones et al. | |
| 6,611,863 B1 | 8/2003 | Banginwar | |
| 7,650,446 B2 | 1/2010 | Nonaka et al. | |
| 7,738,366 B2 | 6/2010 | Uddenberg | |
| 7,912,992 B2 | 3/2011 | Suzuki | |
| 2002/0046566 A1 | 4/2002 | Liao | |
| 2003/0076788 A1 | 4/2003 | Grabauskas et al. | |
| 2003/0097438 A1 | 5/2003 | Bearden | |
| 2003/0217212 A1 | 11/2003 | Kim | |
| 2004/0205288 A1 | 10/2004 | Ghaffari | |
| 2005/0015532 A1 | 1/2005 | Beckett | |

(Continued)

OTHER PUBLICATIONS

IBM SAS RAID Controller Module, Installation and user guide v2, © Copyright IBM Corp. 2008, 2009.

(Continued)

*Primary Examiner* — John Lane
(74) *Attorney, Agent, or Firm* — Duft Bornsen & Fettig LLP (57) ABSTRACT

Methods and structure are provided for provisioning a Redundant Array of Independent Disks (RAID) volume via an expander that can be used to provision a RAID volume managed by an external RAID controller. The structure includes a Serial Attached SCSI (SAS) expander. The expander comprises physical links with transceivers (PHYs) that directly couple with storage devices, a protocol target and a control unit. The control unit provisions a first RAID volume with multiple storage devices that are directly coupled with the PHYs, and is further masks the storage devices from a SAS domain, by presenting the PHYs directly coupled with the multiple storage devices as a single PHY coupled with a single logical device. The control unit is also operable to provision a portion of a second RAID volume on the logical device in response to the expander receiving a command from a RAID controller.

20 Claims, 5 Drawing Sheets

(56) References Cited

U.S. PATENT DOCUMENTS

| | | | |
|---|---|---|---|
| 2005/0066100 A1* | 3/2005 | Elliott et al. | 710/300 |
| 2005/0080881 A1 | 4/2005 | Voorhees | |
| 2006/0095625 A1 | 5/2006 | Wootten | |
| 2006/0101171 A1 | 5/2006 | Grieff | |
| 2006/0156055 A1 | 7/2006 | Cherian | |
| 2007/0220204 A1 | 9/2007 | Nakajima | |
| 2007/0226415 A1 | 9/2007 | Holland | |
| 2008/0189723 A1 | 8/2008 | Elliott | |
| 2008/0288670 A1 | 11/2008 | Chambliss et al. | |
| 2009/0007155 A1 | 1/2009 | Jones | |
| 2009/0094620 A1 | 4/2009 | Kalwitz | |
| 2009/0282203 A1 | 11/2009 | Haustein et al. | |
| 2011/0145452 A1* | 6/2011 | Schilling et al. | 710/74 |
| 2012/0084486 A1 | 4/2012 | Jinno | |
| 2012/0124286 A1 | 5/2012 | Galloway | |
| 2012/0144082 A1 | 6/2012 | Romero | |
| 2012/0254535 A1 | 10/2012 | Hay | |
| 2013/0013828 A1* | 1/2013 | Pang et al. | 710/74 |
| 2014/0040510 A1* | 2/2014 | Myrah et al. | 710/11 |

OTHER PUBLICATIONS

Intel® RAID Expander RES2SV240, Product Brief, 2011.
Nested RAID levels, wikipedia, downloaded on Oct. 8, 2012.
U.S. Appl. No. 13/096,404, "Remote Execution of RAID in Large Topologies," filed Apr. 28, 2011.
U.S. Appl. No. 13/171,922, "Methods and Apparatus for Increasing Storage Network Perfromance by Managing a Logical Volume in a Storage Network Switching Component," filed Jun. 29, 2011.
U.S. Appl. No. 13/281,301, "Methods and Systems Using Solid-State Drives as Storage Controller Cache Memory ," filed Oct. 25, 2011.
U.S. Appl. No. 13/365,050, "Methods and Structure for an Improved Solid-State Drive for Use in Caching Applications," filed Feb. 2, 2012.

* cited by examiner

METHODS AND STRUCTURE ESTABLISHING NESTED REDUNDANT ARRAY OF INDEPENDENT DISKS VOLUMES WITH AN EXPANDER

BACKGROUND

1. Field of the Invention

The invention relates generally to Serial Attached SCSI (SAS) domains and more specifically relates to enhanced SAS expanders.

2. Discussion of Related Art

In SAS domains (i.e., electronic systems implementing a switched SAS fabric), it is common for a Redundant Array of Independent Disks (RAID) controller to manage a large number of RAID logical volumes. RAID volumes offer benefits over other logical volumes because RAID volumes may provide striped data for enhanced performance, and also may provide redundancy information for the data to enhance reliability.

SAS storage devices that provision RAID logical volumes may be coupled for communication with the RAID controller via one or more SAS expanders. The SAS expanders route commands from the RAID controller to the appropriate storage devices.

There are many different levels of RAID that may be implemented by a RAID controller for a volume. For example, a volume may be a RAID 1 volume, and therefore may mirror data in order to enhance redundancy. In another example, a volume may be a RAID 0 volume, which exhibits striping but no redundancy. RAID 5 and 6 both exhibit striping as well as redundancy. A RAID volume may be configured by a controller to exhibit multiple RAID levels at once. For example, a RAID volume may be defined by a RAID controller as a RAID 10 volume (indicating the combination of RAID 1 mirroring and RAID 0 striping), may be defined by a RAID controller as a RAID 51 volume (indicating the combination of RAID 5 striping, RAID 5 redundancy information, and RAID 1 mirroring), etc.

More complex levels of RAID tend to exhibit greater advantages in terms of latency, throughput, and redundancy, which is greatly desirable to an end user. However, the more complex levels of RAID also require greater levels of processing overhead when they are managed, checked for consistency, rebuilt, and generally maintained. In complex SAS topologies where a single RAID controller manages multiple RAID volumes (e.g., tens of volumes) connected across a switched fabric of expanders, the overhead requirements of the various RAID volumes may result in a large queue of maintenance tasks that inhibit the overall processing of host Input and/or Output (I/O) commands. Thus, even though the RAID volumes themselves can provide data quickly and store it redundantly, host I/O processing remains slow because the RAID controller cannot handle the increased workload involved in managing the various RAID volumes.

Thus, it is an ongoing challenge to provide RAID volumes that exhibit enhanced performance characteristics without overloading the processing capabilities of the RAID controllers that manage those volumes.

SUMMARY

The present invention addresses the above and other problems, thereby advancing the state of the useful arts, by providing methods and structure for SAS expanders to define RAID volumes provisioned by multiple directly coupled storage devices. The SAS expanders perform various management tasks to maintain the RAID volumes. The SAS expanders also mask the presence of the storage devices that implement the RAID volumes. Each RAID volume (and the set of storage devices that provision it) therefore appears to a RAID controller as an individual storage device. Therefore, a RAID controller may assemble these bottom-level RAID volumes managed by the expanders into top-level RAID volumes managed by the RAID controller. Each bottom-level RAID volume acts as a storage device for a top-level RAID volume. In this manner, the RAID controller exhibits low overhead, because the SAS expanders perform maintenance for a level of RAID. At the same time, the RAID controller reaps the enhanced performance and redundancy exhibited by multi-level RAID systems.

In one aspect hereof, a method is provided for operating a Serial Attached SCSI (SAS) expander, the SAS expander comprising multiple physical links with associated transceivers (PHYs) that are each directly coupled with a corresponding storage device. The method comprises provisioning, via a control unit of the expander, a first Redundant Array of Independent Disks (RAID) volume with multiple storage devices that are directly coupled with the PHYs. The method also comprises masking, via the control unit, the existence of the multiple storage devices from a SAS domain, by presenting the PHYs directly coupled with the multiple storage devices as a single PHY coupled with a single logical device accessible via the protocol target. Further, the method comprises receiving, at the protocol target, a command from a RAID controller to provision a portion of a second RAID volume on the logical device, and provisioning via the control unit, responsive to receiving the command, the portion of the second RAID volume on the logical device.

Another aspect hereof provides a Serial Attached SCSI (SAS) expander. The expander comprises multiple physical links with associated transceivers (PHYs) that are each operable to directly couple with a corresponding storage device, a protocol target and a control unit. The control unit is operable to provision a first Redundant Array of Independent Disks (RAID) volume with multiple storage devices that are directly coupled with the PHYs, and is further operable to mask the existence of the multiple storage devices from a SAS domain, by presenting the PHYs directly coupled with the multiple storage devices as a single PHY coupled with a single logical device accessible via the protocol target. The control unit is also operable to provision a portion of a second RAID volume on the logical device in response to the protocol target receiving a command from a RAID controller.

Another aspect hereof provides a non-transitory computer readable medium embodying programmed instructions which, when executed by a processor, are operable for performing a method for operating a Serial Attached SCSI (SAS) expander, the SAS expander comprising multiple physical links with associated transceivers (PHYs) that are each directly coupled with a corresponding storage device. The method comprises provisioning, via a control unit of the expander, a first Redundant Array of Independent Disks (RAID) volume with multiple storage devices that are directly coupled with the PHYs. The method also comprises masking, via the control unit, the existence of the multiple storage devices from a SAS domain, by presenting the PHYs directly coupled with the multiple storage devices as a single PHY coupled with a single logical device accessible via the protocol target. Further, the method comprises receiving, at the protocol target, a command from a RAID controller to provision a portion of a second RAID volume on the logical device, and provisioning via the control unit, responsive to receiving the command, the portion of the second RAID volume on the logical device.

DETAILED DESCRIPTION OF THE DRAWINGS

Figure 1:
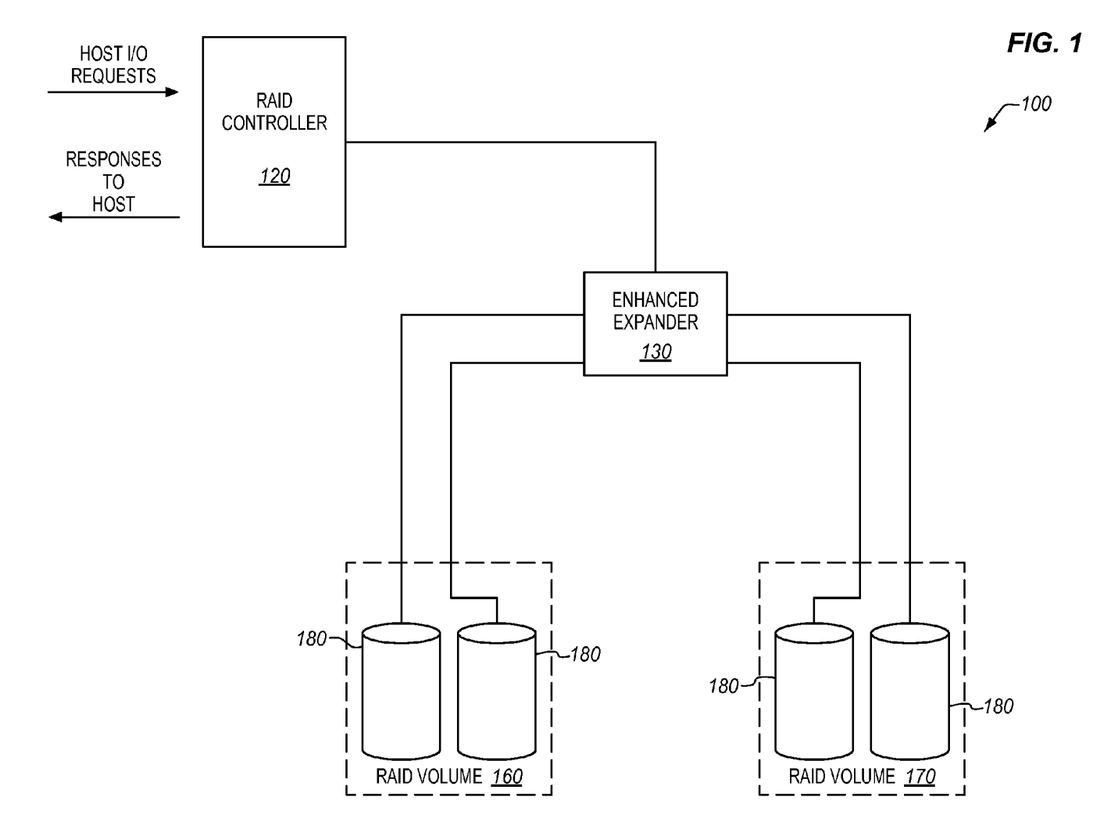
FIG. 1 is a block diagram of an exemplary Serial Attached SCSI (SAS) domain in accordance with features and aspects hereof

FIG. 1 is a block diagram of an exemplary Serial Attached SCSI (SAS) domain 100 in accordance with features and aspects hereof In this embodiment, SAS domain 100 includes RAID controller 120, which is coupled with enhanced SAS expander 130. SAS expander 130 is coupled with multiple storage devices 180.

RAID controller 120 of SAS domain 100 receives Input and/or Output commands (I/O) from a host. The host reads from and writes to a RAID volume (not shown) managed by RAID controller 120. The host may comprise any suitable system capable of performing processing operations upon stored data (e.g., a server, general purpose computer, etc.).

RAID controller 120 is a SAS compliant component that manages one or more RAID volumes, and is operable to process incoming host I/O directed to the RAID volumes that it manages. RAID controller 120 may be implemented, for example, as custom circuitry, as a special or general purpose processor executing programmed instructions stored in an associated program memory, or some combination thereof RAID controller 120 may comprise an independent SAS device, a Host Bus Adapter (HBA) of a host, an integrated component of a host, etc.

Enhanced SAS expander 130 comprises a SAS expander that is capable of routing commands between RAID controller 120 and other components of SAS domain 100. For example, enhanced SAS expander 130 may route communications between RAID controller 120 and other expanders, or between RAID controller 120 and one or more storage devices. SAS expander 130 performs these actions by establishing switched, temporary communication channels between its various physical links with associated transceivers (PHYs).

Enhanced SAS expander 130 has been improved to include RAID logic which is capable of provisioning RAID volumes 160 and 170 with storage devices 180. For example, RAID volumes 160 and 170 may be RAID 1 volumes, RAID 0 volumes, etc. Enhanced expander 130 masks the availability of storage devices 180 to RAID controller 120. This is performed by expander 130 masking the existence of the PHYs directly coupled with storage devices 180 during discovery. Expander 130 instead represents each group of multiple PHYs and storage devices as a single PHY coupled with a single SAS device having a single SAS address. Thus, external devices view the entire group of PHYs (and their associated storage device) as a single PHY coupled with one device. For example, an exemplary expander with thirty six PHYs may represent one group of eight PHYs with a single PHY, and may represent another group of eight PHYs with another single PHY. Thus, the expander may appear to external devices to have only twenty two PHYs.

When the PHYs are masked into groups that each correspond to a set of storage devices that implement a RAID volume, RAID controller 120 is unable to detect all of storage devices 180. Instead, RAID controller 120 only detects a single protocol target for each of RAID volumes 160 and 170. Each protocol target presents itself as a single logical storage device. Each RAID volume therefore appears to be a single storage device with its own Serial SCSI Protocol (SSP) or Serial Advanced Technology Attachment (SATA) Tunneling Protocol (STP) target.

These RAID volumes, managed by the expander instead of the RAID controller, are referred to herein as "bottom-level" RAID volumes, and their presence (and associated management tasks) are hidden from RAID controller 120. When RAID controller 120 establishes/creates a top-level RAID volume that is provisioned by the storage capabilities of the bottom-level RAID volumes, RAID controller 120 has no knowledge that the bottom-level RAID volumes are not individual storage devices.

When RAID controller 120 assembles a top-level RAID volume out of the bottom-level RAID volumes, the redundancy and/or performance of data stored on storage devices 180 is enhanced (e.g., to exhibit enhanced redundancy or to exhibit a greater degree of striping, which enhances throughput and latency). Furthermore, because some RAID management is performed by expander 130, the processing load on RAID controller 120 is reduced.

The number, configuration, and type of expanders that form a switched fabric of SAS domain 100 (e.g., a Service Delivery Subsystem (SDS) of SAS domain 100) may vary as a matter of design choice. In further embodiments, a large and complex switched fabric may separate the components of SAS domain 100. In still further embodiments, any number of expanders 130 of SAS domain 100 may exhibit the enhanced features described herein.

RAID volumes 160 and 170 comprise allocated storage space and data provisioned on storage devices 180. The RAID volumes may be set up in any suitable RAID configuration (e.g., RAID 1, 10, 5, 60, 1E, etc.) by enhanced expander 130. Each RAID volume may be provisioned on a greater or lesser number of storage devices as a matter of design choice. The storage devices need not be dedicated to one specific RAID volume, but may also store data for a number of other logical volumes.

In one embodiment, the groups of PHYs (and associated storage devices) that are masked by enhanced expander 130 (and used to provision one or more of the RAID volumes) are defined by external input and stored in memory. Once SAS domain 100 initializes and performs discovery, enhanced expander 130 can selectively hide the existence of these PHYs based on this information in memory.

Storage devices 180 provision the storage capacity of bottom-level RAID volumes 160 and 170, and may comprise any media and/or interfaces capable of storing and/or retrieving data in a computer-readable format. For example, the storage devices may comprise magnetic hard disks, solid state drives, optical media, etc. compliant with protocols for one or more of SAS, SATA, Fibre Channel, etc. The number of storage devices utilized by SAS domain 100 may vary as a matter of design choice.

Note that the particular arrangement of components described herein is merely intended to be exemplary, and one of ordinary skill in the art will appreciate that the specific arrangement and configuration of SAS components is merely a matter of design choice.

Figure 2:
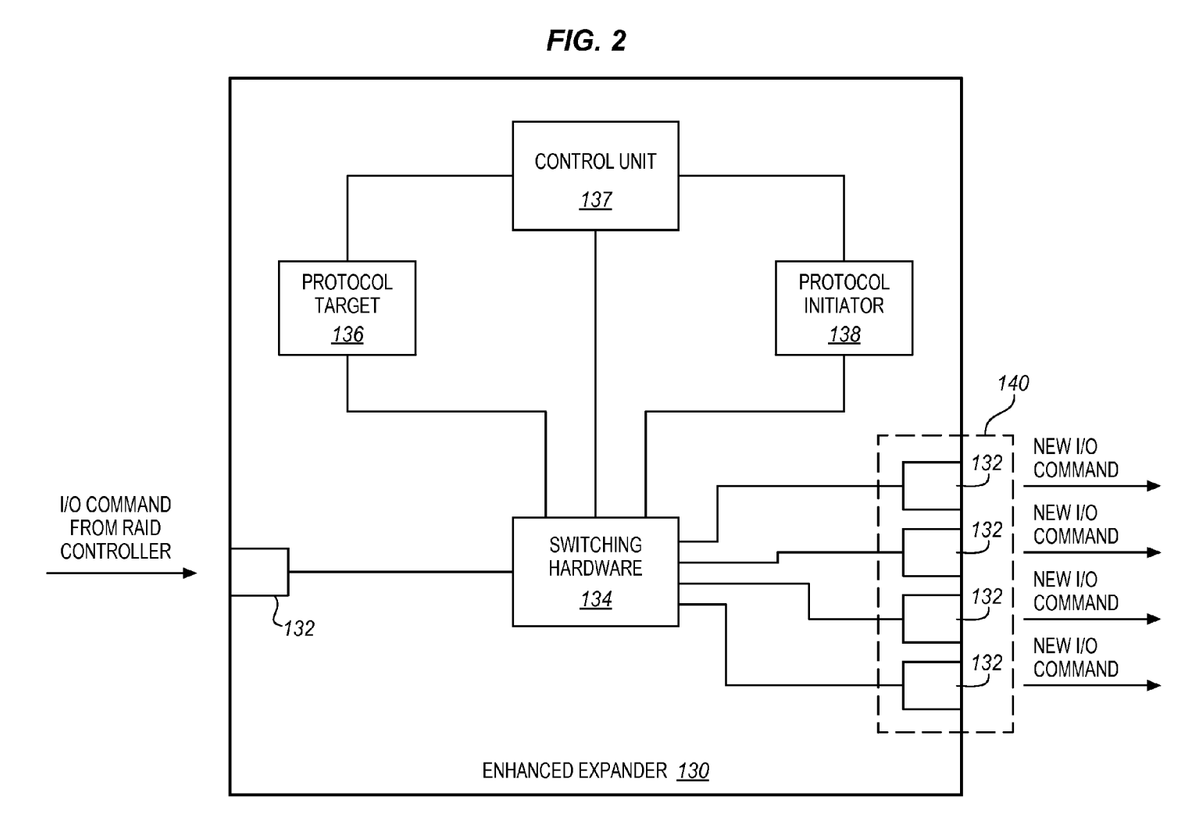
FIG. 2 is a block diagram of an exemplary enhanced SAS expander in accordance with features and aspects hereof

FIG. 2 is a block diagram of an exemplary enhanced SAS expander 130 in accordance with features and aspects hereof. According to FIG. 2, enhanced SAS expander 130 includes PHYs 132. SAS expander 130 further includes switching hardware 134, which is operable to establish connections between various PHYs 132 in order to enable communications between them. The operations of switching hardware 134 (e.g. a "crossbar" switch) are managed by control logic and hardware at expander 130, which in this embodiment is a component of control unit 137. Control unit 137 may be implemented, for example, as custom circuitry, as a special or general purpose processor executing programmed instructions stored in an associated program memory, or some combination thereof Enhanced SAS expander 130 further includes one or more protocol targets 136 and protocol initiators 138. Protocol target 136 may comprise an SSP target or an STP target, and control unit 137 may include logic for converting incoming commands between SSP and STP as needed for protocol target 136. Protocol target 136 receives commands from an external RAID controller that would normally be directed to a single storage device by the RAID controller. However, protocol target 136 actually represents a group of multiple storage devices that are directly coupled with respective PHYs of expander 130 (as indicated by dashed box 140 around the PHYs on the right side of FIG. 2). This group of multiple storage devices is configured, by control unit 137, into a bottom-level RAID volume.

When a RAID controller uses bottom-level RAID volumes as storage devices to establish/create a top-level RAID volume, protocol target 136 may receive corresponding commands from the RAID controller. Control unit 137 processes these commands to establish the top-level RAID volume, and may further store data indicating the configuration of the top-level RAID volume (e.g., the extent and location of data from the top-level RAID volume). Control unit 137 may further maintain mapping information indicating how data in the top-level RAID volume is stored in the bottom-level RAID volumes. This may allow control unit 137 to properly retrieve data from the top-level RAID volume as requested by the RAID controller once the top-level RAID volume has been established. For example, control unit 137 may maintain information mapping Logical Block Addresses (LBAs) between the bottom-level RAID volumes and the storage devices that provision them.

Because the presence of the bottom-level RAID volume (and its associated storage devices and PHYs) is hidden from the RAID controller communicating with SAS expander 130, the commands from the RAID controller cannot be directly applied to the storage devices that provision the bottom-level RAID volume. Control unit 137 therefore processes incoming commands received at protocol target 136, and generates one or more commands directed by protocol initiator 138 to the storage devices implementing the bottom-level RAID volume. These commands generated within the expander and sent out by protocol initiator 138 serve to stripe or mirror incoming data to the appropriate storage devices that implement the bottom-level RAID volume. Protocol initiator 138 therefore serves to communicate with individual storage devices, utilizing SSP or STP to manipulate the bottom-level RAID volume based on instructions from control unit 137.

Control unit 137 manages the generation of commands at protocol initiator 138 for storage devices that provision bottom-level RAID volumes. Protocol initiator 138 may comprise an SSP initiator or an STP initiator.

Protocol target 136 and protocol initiator 138 may be integrated within expander 130 as an element of control unit 137, or may comprise independent processing elements of expander 130. In one embodiment, they are each associated with a SAS address and therefore appear to other elements of SAS domain 100 as an end device coupled to expander 130. Thus, when incoming commands directed to protocol target 136 are received at a PHY of expander 130, they are forwarded to protocol target 136 by switching hardware 134 and/or control unit 137.

Figure 3:
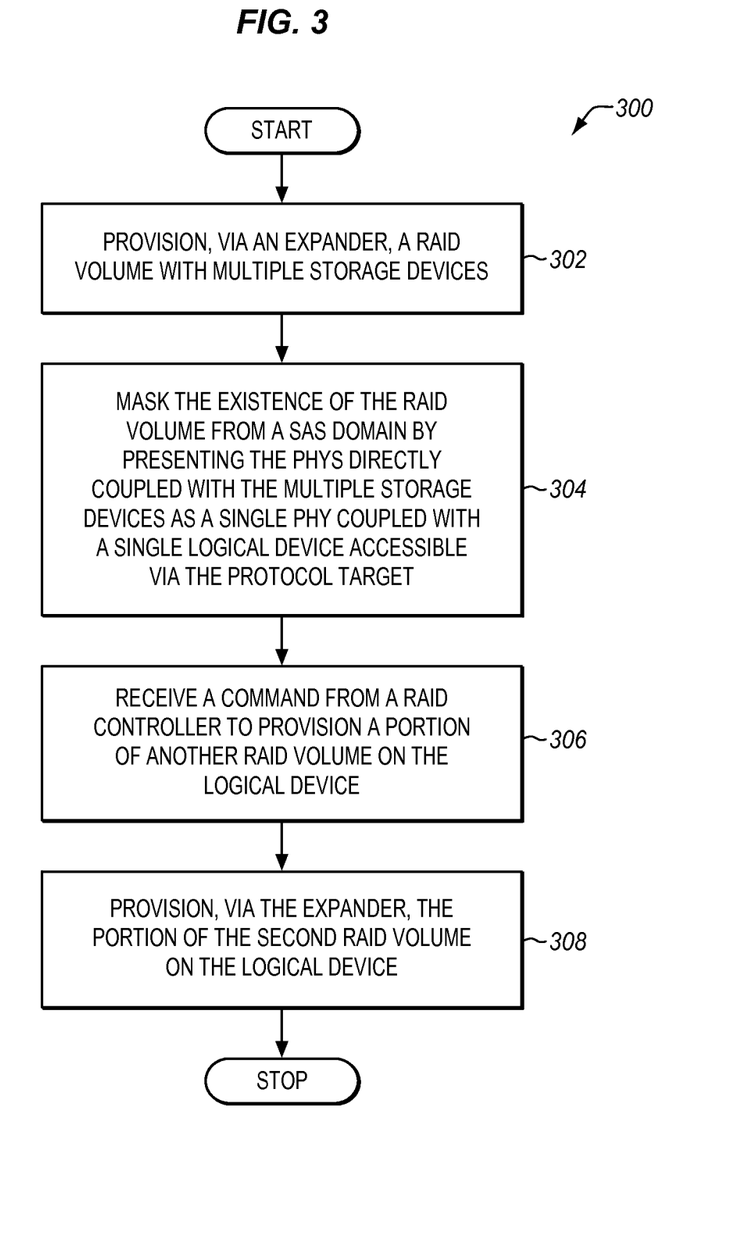
FIG. 3 is a flowchart describing an exemplary method in accordance with features and aspects hereof to operate a SAS expander.

FIG. 3 is a flowchart describing an exemplary method 300 in accordance with features and aspects hereof to operate a SAS expander. The method of FIG. 3 may be operable in a SAS domain such as described above with regard to FIG. 1. The steps of the flowcharts described herein are not all inclusive and may include other steps not shown. The steps described herein may also be performed in an alternative order.

Assume, for this embodiment, that a SAS domain has been configured that includes a RAID controller and an enhanced SAS expander. During discovery on the SAS domain (i.e., at start-of-day), the SAS expander hides the presence of groups of its PHYs, as well as the presence of the storage devices that are directly coupled with these PHYs. Each group of directly coupled storage devices is presented to other SAS domain elements as a single protocol target (i.e., as a single SAS address in the domain), and therefore each group of storage devices appears, to other SAS domain components, to be a single storage device.

In step 302, a control unit of the expander provisions a first Redundant Array of Independent Disks (RAID) volume with multiple storage devices that are directly coupled with the PHYs of the expander. This may comprise, for example, establishing one or more RAID 1 or RAID 0 volumes, one for each group of storage devices that are associated with a single protocol target of the expander. This may further include establishing appropriate redundancy information, data mirroring, and mapping information on the storage devices. While the RAID volume is operating, the SAS expander may perform RAID management operations to ensure the integrity of volume data.

In step 304, the control unit of the SAS expander masks the existence of the RAID volume from the SAS domain. This is achieved by hiding the presence of the PHYs that are directly coupled with the storage devices that provision the bottom-level RAID volume. A protocol target of the expander is used to stand-in for the hidden PHYs, representing itself as a single logical storage device coupled with a single PHY of the expander. This first RAID volume is therefore referred to as a bottom-level RAID volume, because its presence is hidden from other elements of the SAS domain. To the other SAS domain elements, the bottom-level RAID volume appears to be a single storage device accessed through the single SAS address of the protocol target.

Masking the existence of the RAID volume (and the presence of the storage devices that implement the volume) may comprise blocking SAS discovery requests directed to PHYs of the expander and/or storage devices that are directly coupled with those PHYs. It may further comprise the SAS expander indicating that it has fewer PHYs than it actually does. For example, the SAS expander may indicate to external devices that it has only one PHY for each group of PHYs described above. Thus, the SAS expander may respond to an SMP report general command (sent by an initiator) by indicating that it has a smaller number of PHYs than it actually includes. The SAS expander may further represent the entire masked group of PHYs with a single entry in a routing table. Steps 302 and 304 may be performed as start-of-day activities taking place before or during discovery on the SAS domain.

In step 306, the protocol target receives a command from a RAID controller to provision a portion of a second RAID volume on the logical storage device. The second RAID volume, being constructed from the bottom-level RAID volumes, is referred to herein as a top-level RAID volume. To the RAID controller, each bottom-level RAID volume simply appears to be another storage device.

In step 308, a control unit of the expander provisions a portion of the second RAID volume (the top-level RAID volume) onto the logical device. This may comprise allocating space on the first RAID volume, generating mapping information correlating locations on the second RAID volume with locations on the storage devices that provision the second RAID volume. This may be performed in accordance with parameters provided by the external RAID controller.

Once the top-level RAID volume has been provisioned by the bottom-level RAID volumes, the expander may perform processing to stripe and/or mirror I/O for the top-level RAID volume onto the bottom-level RAID volumes.

Figure 4:
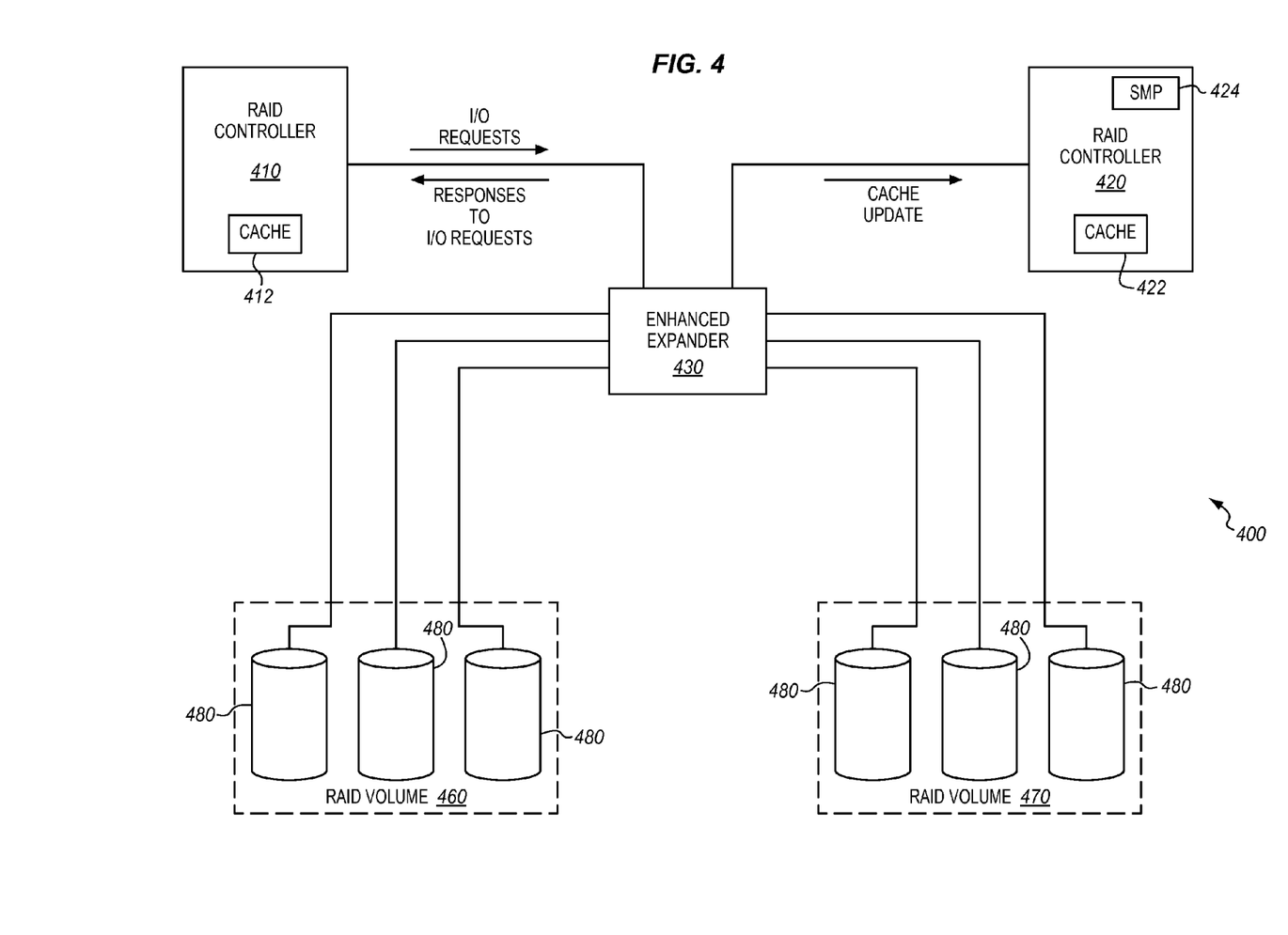
FIG. 4 is a block diagram illustrating an exemplary multi-initiator SAS domain in accordance with features and aspects hereof

FIG. 4 is a block diagram illustrating an exemplary multi-initiator SAS domain 400 in accordance with features and aspects hereof According to FIG. 4, multiple RAID controllers exist which may communicate with enhanced expander 430, which provisions RAID volumes 460 and 470 on storage devices 480. RAID volumes 460 and 470 appear to the RAID controllers of SAS domain 400 as individual storage devices. Because of this, RAID controller 410 has provisioned a top-level RAID volume (not shown) by using RAID volumes 460 and 470 as storage devices.

RAID controller 410 includes a cache memory 412, and uses cache memory 412 to store data that is being written to the top-level RAID volume. RAID controller 420 may or may not have write access to the top-level RAID volume, but it does process incoming host requests in order to read data from the top-level RAID volume. Thus, both RAID controller 410 and RAID controller 420 share access to the top level RAID volume. RAID controller 420 therefore also includes a cache memory 422. When incoming commands from RAID controller 410 modify the data at the top-level RAID volume, the caches maintained at the different RAID controllers may no longer be coherent with each other. To address this problem, enhanced expander 430 is capable of reporting that change to SMP target 424 of RAID controller 420 (e.g., by transmitting a Serial Management Protocol (SMP) command). RAID controller 420 may then update its cache based upon the received command. This enables RAID controller 420 to maintain a cache that is coherent with the cache of RAID controller 410, even though RAID controller 420 does not directly communicate with RAID controller 410.

Figure 5:
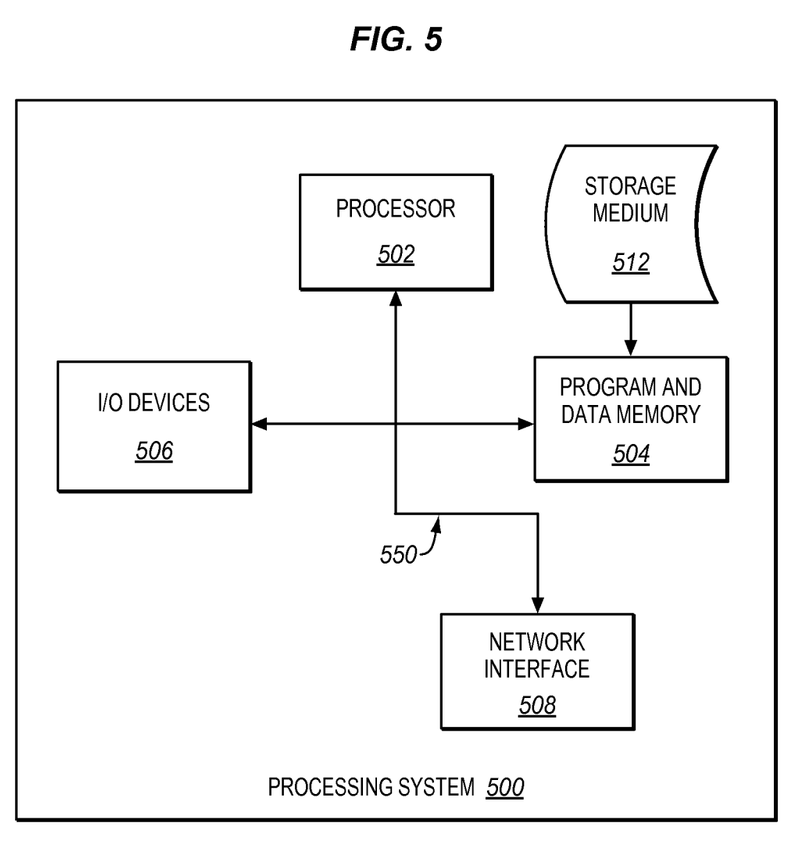
FIG. 5 illustrates an exemplary processing system operable to execute a computer readable medium embodying programmed instructions to perform desired functions in accordance with features and aspects hereof.

FIG. 5 illustrates a processing system 500 (such as within enhanced expander 130 of FIGS. 1-2) operable to execute a computer readable medium embodying programmed instructions to perform desired functions in an exemplary embodiment. Processing system 500 is operable to perform the above operations by executing programmed instructions tangibly embodied on computer readable storage medium 512. In this regard, embodiments of the invention can take the form of a computer program accessible via computer-readable medium 512 providing program code for use by a computer or any other instruction execution system. For the purposes of this description, computer readable storage medium 512 can be anything that can contain or store the program for use by the computer.

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (e.g., PHY interfaces) can be coupled either directly or through intervening I/O controllers. Network adapter interfaces 508 may also be integrated with the system to enable processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) expander comprising:
multiple physical links with associated transceivers (PHYs) that are each operable to directly couple with a corresponding storage device;
a protocol target; and
a control unit operable to provision a first Redundant Array of Independent Disks (RAID) volume with multiple storage devices that are directly coupled with the PHYs, further operable to mask the existence of the multiple storage devices from a SAS domain, by presenting the PHYs directly coupled with the multiple storage devices as a single PHY coupled with a single logical device accessible via the protocol target,
where the control unit is further operable to provision a portion of a second RAID volume on the logical device in response to the protocol target receiving a command from a RAID controller.

2. The SAS expander of claim 1 wherein:
the SAS expander is coupled with the RAID controller as well as an other RAID controller;
the protocol target is further operable to receive Input/Output (I/O) commands directed to the second RAID volume by the RAID controller that modify the contents of the second RAID volume; and
the control unit is further operable to notify the other RAID controller of changes to the second RAID volume based on the received I/O commands.

3. The SAS expander of claim 1 wherein:
the command from the RAID controller indicates a configuration of the second RAID volume; and
the control unit of the SAS expander is further operable to maintain information describing the configuration of the second RAID volume within a memory of the expander.

4. The SAS expander of claim 3 wherein:
the command that indicates the configuration of the second RAID volume describes the extent and location of data for the second RAID volume within the first RAID volume.

5. The expander of claim 1 wherein:
the protocol target comprises a Serial SCSI Protocol (SSP) target.

6. The expander of claim 1 wherein:
the protocol target comprises a Serial Advanced Technology Attachment (SATA) Tunneling Protocol (STP) target.

7. The SAS expander of claim 1 wherein:
the protocol target is further operable to receive a write command directed to the second RAID volume, and the control unit is further operable to generate one or more corresponding write commands directed to the multiple storage devices that provision the first RAID volume.

8. The SAS expander of claim 1 wherein:
the control unit of the SAS expander is further operable to maintain mapping information correlating Logical Block Addresses (LBAs) in the second RAID volume with LBAs in the first RAID volume.

9. The SAS expander of claim 8 wherein:
the first RAID volume comprises a striped RAID volume.

10. A method for operating a Serial Attached SCSI (SAS) expander, the SAS expander comprising multiple physical links with associated transceivers (PHYs) that are each directly coupled with a corresponding storage device, the method comprising:
provisioning, via a control unit of the expander, a first Redundant Array of Independent Disks (RAID) volume with multiple storage devices that are directly coupled with the PHYs;
masking, via the control unit, the existence of the multiple storage devices from a SAS domain, by presenting the PHYs directly coupled with the multiple storage devices as a single PHY coupled with a single logical device accessible via a protocol target;
receiving, at the protocol target, a command from a RAID controller to provision a portion of a second RAID volume on the logical device; and
provisioning via the control unit, responsive to receiving the command, the portion of the second RAID volume on the logical device.

11. The method of claim 10 wherein:
the SAS expander is coupled with the RAID controller as well as an other RAID controller, and the method further includes:
receiving, at the protocol target, Input/Output (I/O) commands directed to the second RAID volume by the RAID controller that modify the contents of the second RAID volume; and
notifying the other RAID controller of changes to the second RAID volume based on the received I/O commands.

12. The method of claim 10 wherein:
the command from the RAID controller indicates a configuration of the second RAID volume, and the method further comprises:
maintaining information describing the configuration of the second RAID volume within a memory of the expander.

13. The method of claim 12 wherein:
the command that indicates the configuration of the second RAID volume describes the extent and location of data for the second RAID volume within the first RAID volume.

14. The method of claim 10 wherein:
the protocol target comprises a Serial SCSI Protocol (SSP) target.

15. The method of claim 10 wherein:
the protocol target comprises a Serial Advanced Technology Attachment (SATA) Tunneling Protocol (STP) target.

16. The method of claim 10 further comprising:
receiving, at the protocol target, a write command directed to the second RAID volume;
generating, at the control unit, one or more corresponding write commands directed to the multiple storage devices that provision the first RAID volume.

17. The method of claim 10 further comprising:
maintaining, via the control unit of the SAS expander, mapping information correlating Logical Block Addresses (LBAs) in the second RAID volume with LBAs in the first RAID volume.

18. The method of claim 17 wherein:
the first RAID volume comprises a striped RAID volume.

19. A non-transitory computer readable medium embodying programmed instructions which, when executed by a processor, are operable for performing a method for operating a Serial Attached SCSI (SAS) expander, the SAS expander comprising multiple physical links with associated transceivers (PHYs) that are each directly coupled with a corresponding storage device, the method comprising:
provisioning, via a control unit of the expander, a first Redundant Array of Independent Disks (RAID) volume with multiple storage devices that are directly coupled with the PHYs;
masking, via the control unit, the existence of the multiple storage devices from a SAS domain, by presenting the PHYs directly coupled with the multiple storage devices as a single PHY coupled with a single logical device accessible via a protocol target;
receiving, at the protocol target, a command from a RAID controller to provision a portion of a second RAID volume on the logical device; and
provisioning via the control unit, responsive to receiving the command, the portion of the second RAID volume on the logical device.

20. The medium of claim 19, wherein:
the SAS expander is coupled with the RAID controller as well as an other RAID controller, and the method further includes:
receiving, at the protocol target, Input/Output (I/O) commands directed to the second RAID volume by the RAID controller that modify the contents of the second RAID volume; and
notifying the other RAID controller of changes to the second RAID volume based on the received I/O commands.

* * * * *